United States Patent [19]

Föller

[11] 4,347,975
[45] Sep. 7, 1982

[54] BIMETALLIC-CONTROLLED STEAM TRAP

[75] Inventor: Werner Föller, Stuhr, Fed. Rep. of Germany

[73] Assignee: GESTRA-KSB Vertriebsgesellschaft mbH & Co. KG, Bremen, Fed. Rep. of Germany

[21] Appl. No.: 210,080

[22] Filed: Nov. 24, 1980

[30] Foreign Application Priority Data

Dec. 4, 1979 [DE] Fed. Rep. of Germany ....... 2948686

[51] Int. Cl.³ ................................. F16T 1/04
[52] U.S. Cl. .................................. 236/59; 236/101 B
[58] Field of Search ..................... 236/59, 93 R, 101 B

[56] References Cited
U.S. PATENT DOCUMENTS

| 3,226,026 | 12/1965 | Domm et al. | 236/59 |
| 3,353,746 | 11/1967 | Foller | 236/59 |
| 3,362,636 | 1/1968 | Miyawaki | 236/59 |
| 3,985,296 | 10/1976 | Fujiwara | 236/59 |
| 4,060,193 | 11/1977 | Foller | 236/59 |

Primary Examiner—William E. Tapolcai

Attorney, Agent, or Firm—Allison C. Collard; Thomas M. Galgano

[57] ABSTRACT

A steam trap is provided with a bimetallic control element disposed at the prepressure side and a locking element actuated by the bimetallic control element which is biased in the opening direction by the prepressure and which cooperates with a valve seat. The bimetallic control element is provided with at least two bimetallic spring disks which are serially connected in such a manner that when the locking element is open during the slow-speed stroke of the bimetallic spring disks, the stroke movement of the locking element is the sum of the slow-speed strokes of all of the bimetallic spring disks. The bimetallic spring disks are different from each other with respect to their spring force and temperature, as well as with respect to each other's spring constant, so that each of the bimetallic spring disks closes the locking element by a spring stroke within a separate section of the total operating pressure range of the steam trap, at temperatures in the proximity of a predetermined pressure-temperature curve.

6 Claims, 5 Drawing Figures

BIMETALLIC-CONTROLLED STEAM TRAP

The invention relates to a steam trap. More particularly, it relates to a steam trap of the type having a bimetallic control element disposed at the prepressure side and a locking element actuated by the bimetallic control element which is biased in the opening direction by the prepressure and which cooperates with a valve seat.

In such steam traps, an intermittent operation is desired, i.e., a sudden wide opening and a sudden closing. For this purpose, it is known, for example, to provide a large pressure admittance face on the locking element downstream thereof, against which the downstream flow of the condensate may exert an additional opening force on the locking element, thus effecting a wide opening. However, this additional opening force is only generated after a certain opening stroke of the locking element, when condensate is already flowing. Therefore, in low condensate quantities, a balanced condition exists between the locking forces of the bimetallic control elements and the opening forces of the locking element which are determined by the pressure of the condensate, when the locking element opens only insignificantly. In this case, the locking element stays in the throttle position and does not snap into the wide open position.

Bimetallic spring disks which have a small slow-speed stroke in their end zones (slow-speed stroke from the initial position to the snap open position), but which otherwise carry out their stroke in a sudden snap-like operation are suitable, per se, to effect an intermittent operation of the steam trap when condensate is present, without requiring a special pressure admittance face on the downstream side of the locking element. However, with bimetallic spring disks, a linear increase of the locking forces above the temperature occurs and, in contrast thereto, a curve-like path should be obtained, for example, corresponding to the temperature-pressure curve of saturated steam.

It is therefore an object of the invention to provide a steam trap of the aforementioned type by using "bimetallic spring disks", wherein the opening and closing of the locking element takes place in the total operating pressure range of the steam trap, always at temperatures close to a predetermined temperature-pressure curve.

This object of the invention is obtained by the provision of a steam trap of the aforementioned type wherein the bimetallic control element is provided with at least two bimetallic spring disks which are serially connected in such a manner that when the locking element is open during the slow-speed stroke of the bimetallic spring disks, the stroke movement of the locking element is the sum total of the slow-speed strokes of all of the bimetallic spring disks. The bimetallic spring disks are different from each other with respect to their spring force and temperature, as well as with respect to each other's spring constant, so that each of the bimetallic spring disks closes the locking element by a spring stroke within a separate section of the total operating pressure range of the steam trap, at temperatures in the proximity of a predetermined temperature-pressure curve.

Due to the inventive use of a plurality of different bimetallic spring disks whereby only one is effective within a provided partial section of the operating pressure range of the steam trap, while at the same time the others are not effective, a curve is achieved for the locking force which follows quite closely the predetermined temperature-pressure curve.

Preferably, the maximum stroke path of the locking element is less than the maximum stroke of each individual bimetallic spring disk and all of the bimetallic spring disks having substantially the same maximum stroke path. These features are especially effective for the spontaneous opening of the locking element in the total operating pressure range of the steam trap.

In a preferred embodiment of the invention, the at least two bimetallic spring disks are arched in the same direction, when in their cold state, and a stroke transmission member is disposed between two of such arched bimetallic spring disks. The stroke transmission member has a front face with which it centrally engages the concave side of one of the bimetallic spring disks, when in its cold state, and a rear face with which it peripherally and axially engages the convex side of the other bimetallic spring disk, when in its cold state as well.

Most advantageously, the two bimetallic spring disks, in the cold state thereof, may have convex arched faces which face each other, and an axial stroke transmission member which is peripherally disposed therebetween. Alternatively, the two bimetallic spring disks, when in the cold state thereof, may have concave arched faces which face each other, and an axial stroke transmission member which is centrally-disposed therebetween.

The provided stroke transmission members effect a serial connection of the bimetallic spring disks with respect to their slow-speed stroke. Furthermore, the stroke transmission members provide the required free space for the unimpaired stroke movement of the individual bimetallic spring disks.

When the bimetallic disks are arched in the same manner in their cold state, one should use substantially disk-like stroke transmission members. If the bimetallic spring disks are arched oppositely with respect to each other, more or less pipe-like (tube-like) stroke transmission members may be used. The arrangements described above, in connection with the preferred embodiment of the invention, may be used individually or in combination with each other.

Other objects and features of the present invention will become apparent from the following detailed description when taken in connection with the accompanying drawings which disclose one embodiment of the invention. It is to be understood that the drawings are designed for the purpose of illustration only and are not intended as a definition of the limits of the invention.

In the drawings, wherein similar reference characters denote similar elements throughout the several views.

Figure 1:
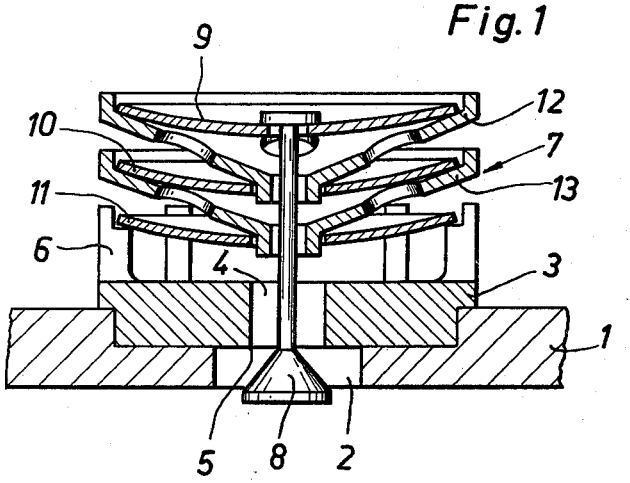
FIG. 1 is a sectional view, in part elevation, of the control unit of a steam trap embodying the present invention, in its open position.

Referring now in detail to the drawings, FIGS. 1 and 3a-3c show the separating wall 1 between the prepressure and the low pressure side of a steam trap housing (not shown), having a throughflow bore 2 for the condensate to be discharged and a control unit.

The control unit comprises a seat element 3 having a central bore 4, a valve seat 5, a support 6, and a bimetallic control element 7 disposed on the prepressure side, as well as a locking element 8 which is biased in the opening direction by the prepressure.

Bimetallic control element 7 is provided with three bimetallic spring disks 9, 10, 11 which, in their cold state, are arched in the same direction with their convex face facing seat element 3 (FIG. 1). The lowermost of these bimetallic spring disks is axially-supported by means of its outer edge portions on support 6. Rigid disk-like stroke transmission members 12, 13 are disposed between bimetallic spring disks 9, 10, 11. They are so shaped that the underside thereof only engages in the central areas of the concave faces of the bimetallic spring disks 10, 11, when in their cold state, while the outer edge portions of their upper faces exclusively engage in an axial direction the convex faces of the bimetallic spring disks 9, 10, when in its cold state, respectively.

The three bimetallic disks 9, 10, 11 are substantially equal with respect to the dimension of their stroke from the initial position to the end position. However, with respect to the spring temperature and force, as well as the spring constant, they differ substantially from each other. Therefore, disk 9 has the lowest values, disk 10 has medium values, and disk 11 has the highest values.

Figure 2:
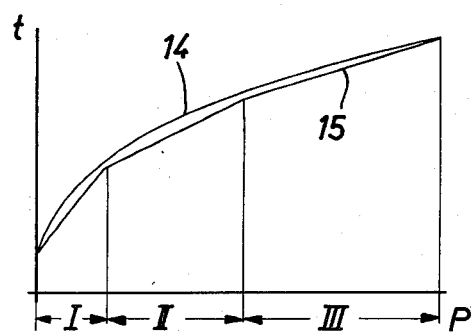
FIG. 2 is a diagram of a saturated steam curve, as well as the curve of the locking force.
Figure 3A:
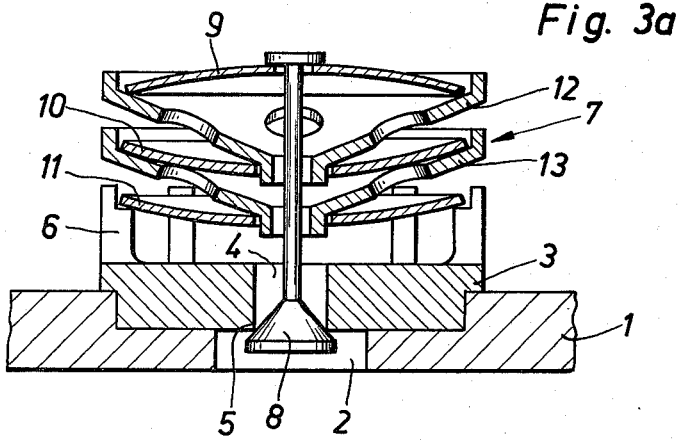
FIGS. 3a-3c are views comparable to that of FIG. 1, but showing the control unit in a closed position, at different operating pressures.
Figure 3B:
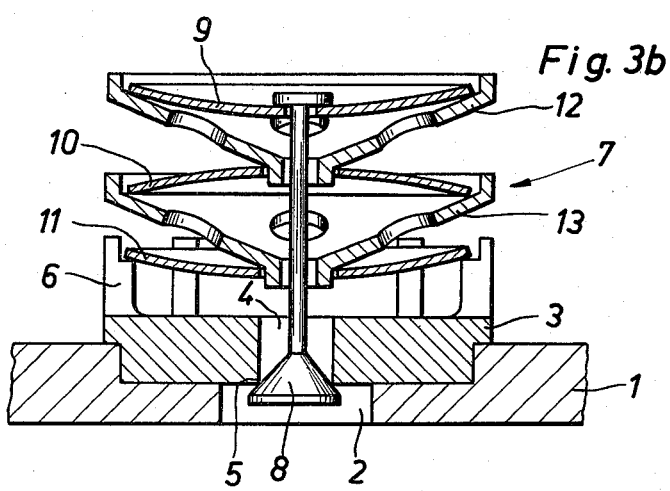
Figure 3C:
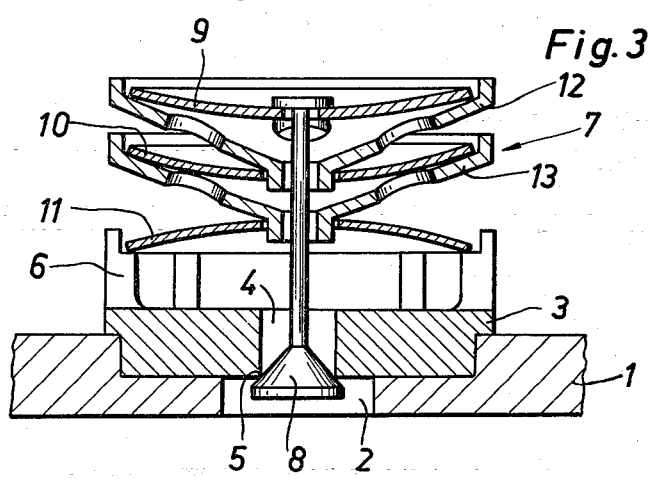

Accordingly, each of the three bimetallic spring disks 9, 10, 11 snap only in a partial segment of the total operating pressure range of the steam trap. For example, disk 9 in the lower pressure range I (FIGS. 2 and 3a), disk 10 in the medium pressure range II (FIGS. 2 and 3b), and finally disk 11 in the upper pressure range III (FIGS. 2 and 3c). The pressure-temperature diagram (FIG. 2) shows the broken curve 15 of the locking-snap temperatures of the individual bimetallic spring disks 9, 10, 11 in their respective pressure range, which run almost parallel to the saturated steam curve 14.

When cold condensate flows through the steam trap, all three bimetallic spring disks 9, 10, 11 are in their initial position shown in FIG. 1, and locking element 8 assumes its maximum open position. When hot condensate flows in, all three bimetallic spring disks 9, 10, 11 carry out a simultaneous slow-speed movement from their lowermost initial position. The sum of such movements effects a first small stroke of the locking element 8; the stroke being small relative to the total stroke thereof. When the medium temperature increases and reaches the approximate saturated steam pressure temperature under the prevailing operating pressure (FIG. 2), only the bimetallic spring disk snaps upwardly (FIG. 3b), which is in the respective pressure range, for example, disk 10 for pressure range II. Thereby, the locking element 8 is suddenly snapped from its wide open position into the locking or closed position. The two other bimetallic disks 9, 11 remain in their convex arched position with espect to seat element 3.

The maximum stroke of the locking element 8 is less than that of one of the individual bimetallic spring disks 9, 10, 11, so that the latter do not completely snap to their full upper end position and cannot reach into the slow-speed stroke range. During a lowering of the temperature, the corresponding bimetallic spring disk, for example, disk 10, together with the locking element 8, move immediately from the locking position into the wide open position.

Within the total operating pressure range, the steam trap always closes with an advantageous low temperature difference with respect to a predetermined pressure-temperature curve, for example, the saturated steam curve 14.

Thus, while only one embodiment of the present invention has been shown and described, it will be obvious that many changes and modifications may be made thereunto, without departing from the spirit and scope of the invention.

What is claimed is:

1. In a steam trap of the type having a bimetallic control element disposable at the prepressure side, a valve seat, and a locking element which cooperates with the valve seat and which is actuated by the bimetallic control element and is biased in an operating direction with respect to the valve seat by the prepressure, the improvement comprising:

said bimetallic control element including at least two bimetallic spring disks which are serially connected so that when the locking element is open during the slow-speed stroke of the bimetallic spring disks, the stroke movement of said locking element is equal to the sum of the slow-speed strokes of all of said bimetallic spring disks, and said bimetallic spring disks being different from one another with respect to their spring force and temperature, as well as with respect to each other's spring constant, so that each of the bimetallic spring disks closes the locking element by a spring stroke within a separate section of the total operating pressure range of the steam trap, at temperatures in the proximity of a predetermined pressure-temperature curve.

2. The steam trap according to claim 1, wherein the maximum stroke path of said locking element is less than the maximum stroke of each individual bimetallic spring disks.

3. The steam trap according to claim 1 or 2, wherein each of said bimetallic spring disks have substantially the same maximum stroke path.

4. The steam trap according to claim 1, wherein said at least two bimetallic spring disks are arched in the same direction in their cold state, and wherein a stroke transmission member is disposed between two of such arched bimetallic spring disks, said stroke transmission member having a front face with which it centrally engages the concave side of one of said bimetallic spring disks, when in its cold state, and a rear face with which it peripherally and axially engages the convex side of the other bimetallic spring disk, when in its cold state.

5. The steam trap according to claim 1, wherein said two bimetallic spring disks, in the cold state thereof, have convex arched faces which face each other, and wherein an axial stroke transmission member is peripherally disposed therebetween.

6. The steam trap according to claim 1, wherein said two bimetallic spring disks, in the cold state thereof, have concave arched faces which face each other, and wherein an axial stroke transmission member is centrally disposed therebetween.

* * * * *